Figure 1:
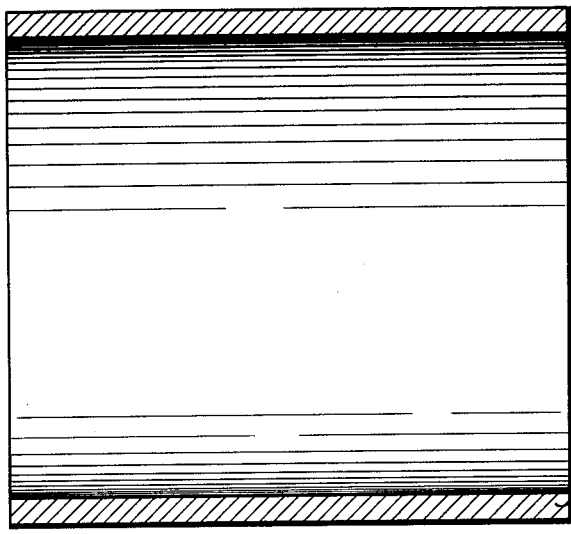

Sept. 7, 1965    G. SCHAEFFLER    3,204,323
METHOD FOR PRODUCTION OF THIN WALLED CYLINDRICAL CAGES
Filed July 8, 1964    3 Sheets-Sheet 1

INVENTOR
GEORG SCHAEFFLER

BY *Hammond and Littell*

ATTORNEYS

Sept. 7, 1965   G. SCHAEFFLER   3,204,323
METHOD FOR PRODUCTION OF THIN WALLED CYLINDRICAL CAGES
Filed July 8, 1964   3 Sheets-Sheet 2
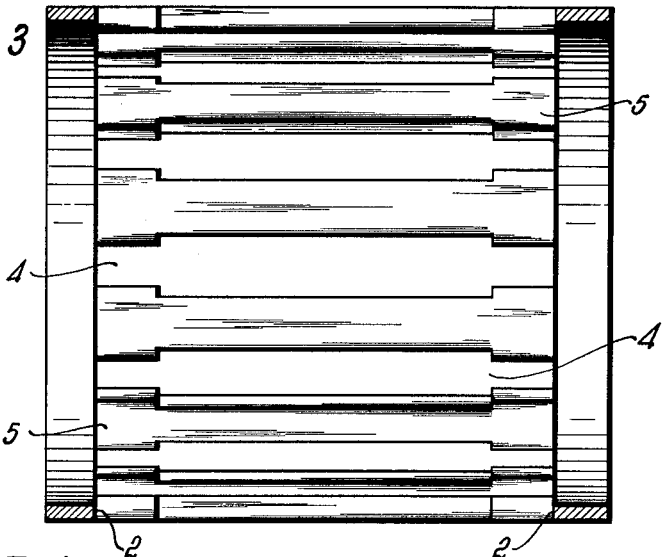
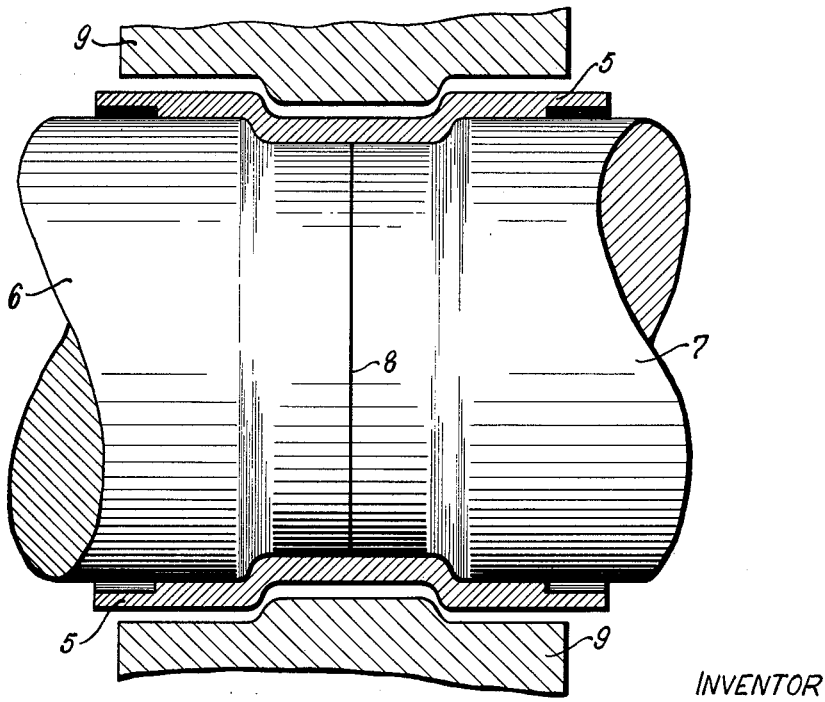
INVENTOR
GEORG SCHAEFFLER
BY Hammond and Littell
ATTORNEYS

INVENTOR
GEORG SCHAEFFLER

ATTORNEYS

United States Patent Office 3,204,323
Patented Sept. 7, 1965

3,204,323
METHOD FOR PRODUCTION OF THIN WALLED CYLINDRICAL CAGES
Georg Schaeffler, Herzogenaurach, near Nurnberg, Germany, assignor to Industriewerk Schaeffler Ohg., Herzogenaurach, near Nurnberg, Germany, a corporation of Germany
Filed July 8, 1964, Ser. No. 381,194
Claims priority, application Germany, July 19, 1963, J 24,103
4 Claims. (Cl. 29—148.4)

The invention relates to a method for the production of thin-walled roller bearing cages for cylindrical rollers, particularly cages wherein the pockets accommodating the said rollers are bounded by bars connected at their ends by radially-inwardly directed flanges, the bars being bent in offset fashion from the cage axis so that the individual bar portions are at different distances from the said axis. The offsetting of the bars provides guiding and retaining zones for the rollers whereby the rollers are either held in one radial direction or in both radial directions and are guided parallel to the cage axis. The radially-inwardly directed flanges at the ends of the thin-walled cage serve as abutment surfaces for the end faces of the rollers and to stiffen the cage.

The known methods of producing such cages involve difficulties since the flanges at the ends of the cages have to be bent over before the pockets are formed by punching and the bars are bent in offset manner and the flanges make it difficult to introduce into the cage the counter-holding tools required for the punching and offsetting operations. Up to now, it has not been possible to form the flanges after the punching and offsetting operations since the thin-walled cage sleeve is not strong due to the punched out pockets and subsequent bending-over of the flanges deforms the circular form of the cage which is unacceptable.

It is an object of the invention to provide a novel method for the production of thin-walled roller bearing cage in a simple manner.

It is another object of the invention to overcome the disadvantages of known methods for the production of thin-walled roller bearing cages.

These and other objects and advantages of the invention will become obvious from the following detailed description.

The method of the invention for the production of thin-walled roller bearing cages for cylindrical rollers wherein the pockets for the rollers are bounded by bars connected to one another at their ends by radially-inwardly directed flanges, the said bars being bent in an offset fashion so that the individual bar portions are at different distances from the cage axis comprises punching pockets for the said rollers in thin-walled cylindrical sleeves, profiling the sleeves to bend the bars in an offset fashion, inserting into the ends of the sleeves rings whose outer diameters are only slightly less than the inner diameter of the sleeve and bending the ends of the cylindrical sleeves radially and inwardly to form flanges close against the said rings which support the sleeves internally.

The inserted rings support the sleeve internally and prevent deformation of the cage while forming the flanges. The punching of the cage pockets and the offsetting of the bars may be carried out using very simple means since the flanges do not interfere with these operations.

For example, the punching out of the cage pockets does not present any difficulty since the punching is performed on a completely smooth sleeve. If the bars are to be bent radially inward in offset manner in their central region, the sleeve may be supported internally by introducing into the sleeve a mandrel with the desired offset configuration and divided into two axial parts with the plane of division situated in the offset region and the bars can be made to conform to the profile of the mandrel by acting upon them from the outside with a press ram. The mandrel which has an outer diameter adapted to the inner diameter of the sleeve is simply separated and withdrawn from both ends of the sleeve after this operation and the flanges are formed as described above.

In order to accurately hold the rings inserted into the cage sleeve in the axial direction, it is preferred to have shoulders in the internal sleeve wall against which the rings abut. This fixes the rings in one axial direction and the rings are fixed in the other axial direction by the bent over flanges which bear closely against the rings. The said shoulders are preferably formed before the punching and offsetting operations by reducing the inner diameter of the sleeve to the desired distance at each end. The rings can be made of a wear-resistant material such as steel or sintered metal which preferably has marked or efficient sliding properties so the fraction on the end faces of the rollers is reduced.

The sequence of the punching and offsetting operations can be reversed if desired. For example, the desired portion of the smooth, thin-walled sleeve where the webs will be situated can be offset, i.e. by rolling in, and then the cage pockets can be punched.

Figure 2:
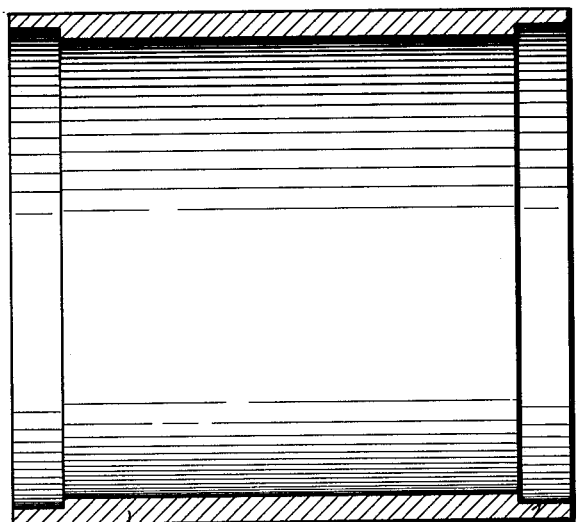
Figure 5:
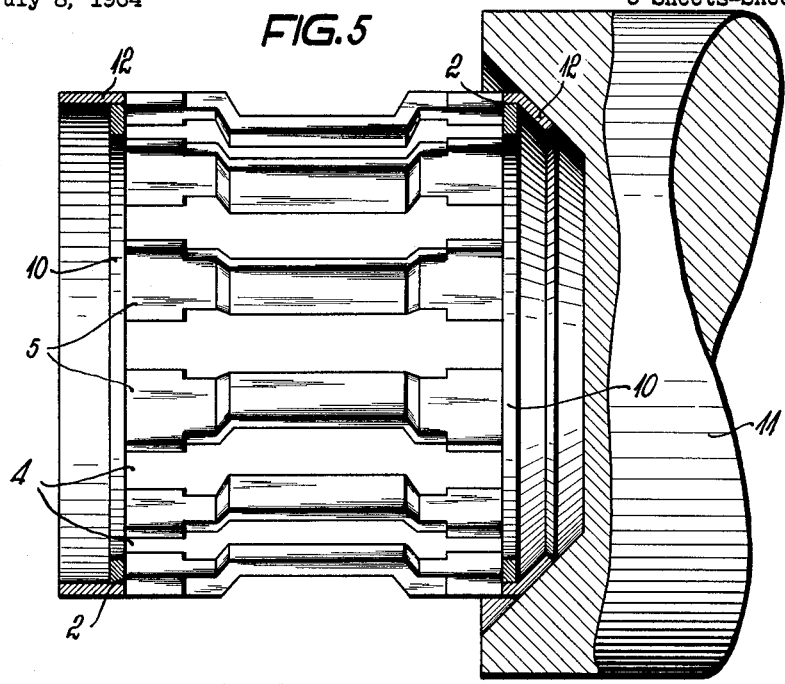
Figure 6:
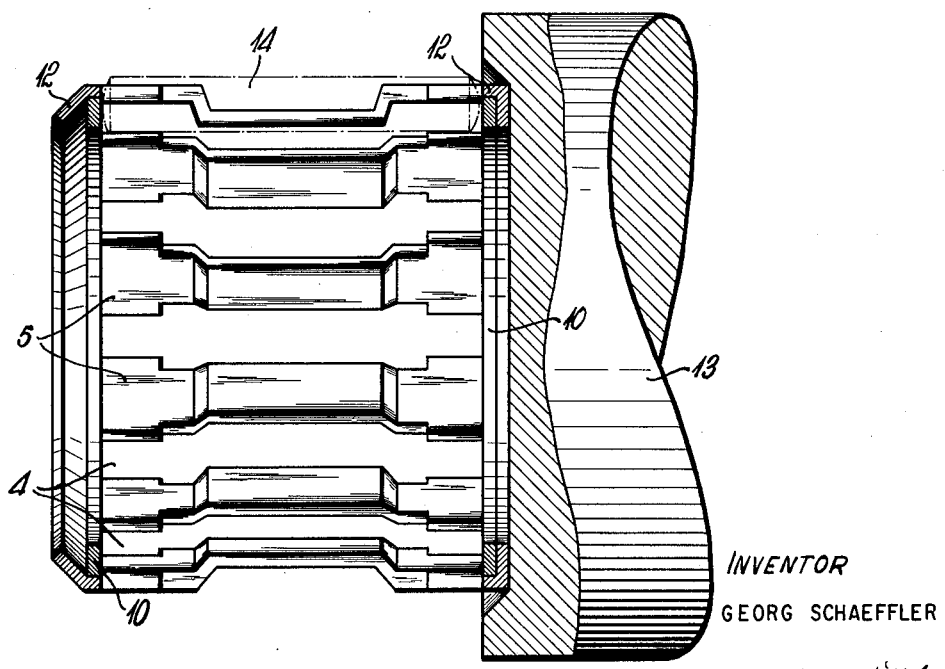

Referring to the drawings:
FIG. 1 shows a cylindrical sleeve and FIG. 2 shows the same sleeve after forming shoulders in the inner wall.
FIG. 3 shows the sleeve after the pockets have been punched and FIG. 4 shows the punched sleeve during the offsetting of the bars.
FIGS. 5 and 6 show the sleeve of FIG. 4 during the bending-over of the flanges.

The embodiment in FIGS. 1 to 6 illustrates the various steps of the method. As shown in FIG. 1, the starting blank or workpiece for the method of the invention is a thin-walled metal sleeve 1 whose inner and outer cylindrical surfaces are completely smooth or rectilinear. In FIG. 2, the sleeve 1 has been provided with shoulders 2 at each end by increasing its internal diameter at the ends.

FIG. 3 shows the same sleeve after punching the cage pockets 4 therein. The cage bars 5 which form the pockets 4 have different widths over their length for their subsequent functions. The cage pockets 4 may be punched in a known manner such as by mounting the sleeve 1 on a profiled mandrel and punching the sleeve with a ram acting radially from the outside. Between each two punching operations the cage sleeve with the mandrel carrying it is rotated by one pocket spacing.

To offset the cage bars 5, FIG. 4 shows two mandrels 6 and 7 abutting against one another at a plane 8 which were introduced in the axial direction into the punched out cage sleeve of FIG. 3. The view of the cage sleeve in FIG. 4 is a sectional plane through a bar 5 in each case. The cage bars 5 are bent inwardly in an offset manner with press rams 9 which act radially in the inward direction from the outside and which are shaped in accordance with mandrel parts 6 and 7. Because of the different widths of the bars 5, the offsetting provides retaining and guiding zones for the rollers which will eventually be inserted into the pockets 4.

FIG. 5 shows the cage of FIG. 4 with rings 10 inserted at both ends of the cage sleeve and bearing axially against the shoulders 2. The annular portions 12 on the right side of the cage sleeve which project beyond the rings 10 are initially partly bent-over with press ram 11 which has a sloping, pressure applying face and acts in an axial direction. In FIG. 6, the annular portion 12 on the left side of the cage is in the position it has after the action of the ram 11. The right side of the cage shows the position of the annular portion 12 after it has been fully bent over by press ram 13 which has a planar pressure applying face. After this operation is completed, the annular portion 12 is deformed to a radially-inwardly directed flange close against inserted ring 10. The dot-dash line in FIG. 6 illustrates the position roller 14 will take when inserted into the completed cage.

Various modifications of the method of the invention may be made without departing from the spirit or scope thereof and it is to be understood that the invention is to be limited only as defined in the appended claims.

I claim:

1. A method for the production of thin-walled, cages for cylindrical rollers in roller bearings wherein the pockets for the rollers are bounded by bars connected to one another at their ends by radially-inwardly directed flanges, the said bars being bent in offset fashion so that the individual bar portions are at different distances from the cage axis which comprises punching pockets for the said rollers in thin-walled cylindrical sleeves, profiling the sleeves to bend the bars in an offset fashion, inserting into the ends of the sleeves rings whose outer diameters are only slightly less than the inner diameter of the sleeve and bending the ends of the cylindrical sleeves radially and inwardly to form flanges close against the said rings which support the sleeves internally.

2. A method for the production of thin-walled cages for cylindrical rollers in roller bearings wherein the pockets for the rollers are bounded by bars connected to one another at their ends by radially-inwardly directed flanges, the said bars being bent in an offset fashion so that the individual bar portions are at different distances from the cage axis which comprises reducing the inner diameter of each end of thin walled, cylindrical sleeves to form shoulders, punching pockets for the said rollers in the sleeves, profiling the sleeves to bend the bars in an offset fashion, inserting into the ends of the sleeves rings whose outer diameters are only slightly less than the reduced inner diameter of the sleeve and which abut against the shoulders and bending the ends of the cylindrical sleeves radially and inwardly to form flanges close against the said rings which support the sleeves internally.

3. A method for the production of thin-walled cages for cylindrical rollers in roller bearings wherein the pockets for the rollers are bounded by radially-inwardly diected flanges, the said bars being bent in an offset fashion so that the individual bar portions are at different distances from the cage axis which comprises profiling thin-walled cylindrical sleeves where the webs are to be situated in an offset manner, punching pockets for the rollers in the sleeves, inserting into the ends of the sleeves rings whose outer diameters are only slightly less than the inner diameter of the sleeve and bending the ends of the cylindrical sleeves radially and inwardly to form flanges close against the said rings which support the sleeves internally.

4. A method for the production of thin-walled cages for cylindrical rollers in roller bearings wherein the pockets for the rollers are bounded by radially-inwardly directed flanges, the said bars being bent in an offset fashion so that the individual bar portions are at different distances from the cage axis which comprises reducing the inner diameter of each end of the thin-walled cylindrical sleeves to form shoulders, profiling the sleeves where the webs are to be situated in an offset manner, punching pockets for the rollers in the sleeves, inserting into the ends of the sleeves rings whose outer diameters are only slightly less than the reduced inner diameter of the sleeve and which abut against the shoulders and bending the ends of the cylindrical sleeves radially and inwardly to form flanges close against the said rings which support the sleeves internally.

References Cited by the Examiner

UNITED STATES PATENTS

| | | | |
|---|---|---|---|
| 1,173,719 | 2/16 | Hirth | 308—217 |
| 2,848,791 | 8/58 | Neese | 29—148.4 |

WHITMORE A. WILTZ, *Primary Examiner.*

THOMAS H. EAGER, *Examiner.*